J. SIEMBAB.
PULLEY ATTACHMENT FOR VEHICLE SUPPORTING WHEELS.
APPLICATION FILED JULY 6, 1921.

1,411,751. Patented Apr. 4, 1922.

Inventor
J. Siembab

By J. W. Bryant
Attorney

UNITED STATES PATENT OFFICE.

JOHN SIEMBAB, OF GRAND RAPIDS, MICHIGAN.

PULLEY ATTACHMENT FOR VEHICLE-SUPPORTING WHEELS.

1,411,751.   Specification of Letters Patent.   Patented Apr. 4, 1922.

Original application filed April 28, 1921, Serial No. 465,207. Divided and this application filed July 6, 1921. Serial No. 482,671.

*To all whom it may concern:*

Be it known that I, JOHN SIEMBAB, a citizen of the United States of America, residing at Grand Rapids, in the county of Kent and State of Michigan, have invented certain new and useful Improvements in Pulley Attachments for Vehicle-Supporting Wheels, of which the following is a specification.

This invention relates to certain new and useful improvements in pulley attachments for vehicle supporting wheels and is a division of my copending application Serial No. 465,207 for railways, filed April 28, 1921.

An object of the invention is to provide rolling stock wheel construction whereby the same may equally as well travel upon land and rail, the wheels being provided with means for ready attachment of a belt pulley whereby power may be transmitted therefrom to any desired point and particularly for the operation of farm machinery or the like.

With the above general object in view and others that will appear as the nature of the invention is better understood, the same consists of the novel form, combination and arrangement of parts hereinafter more fully described, shown in the accompanying drawing and claimed.

Figure 1:
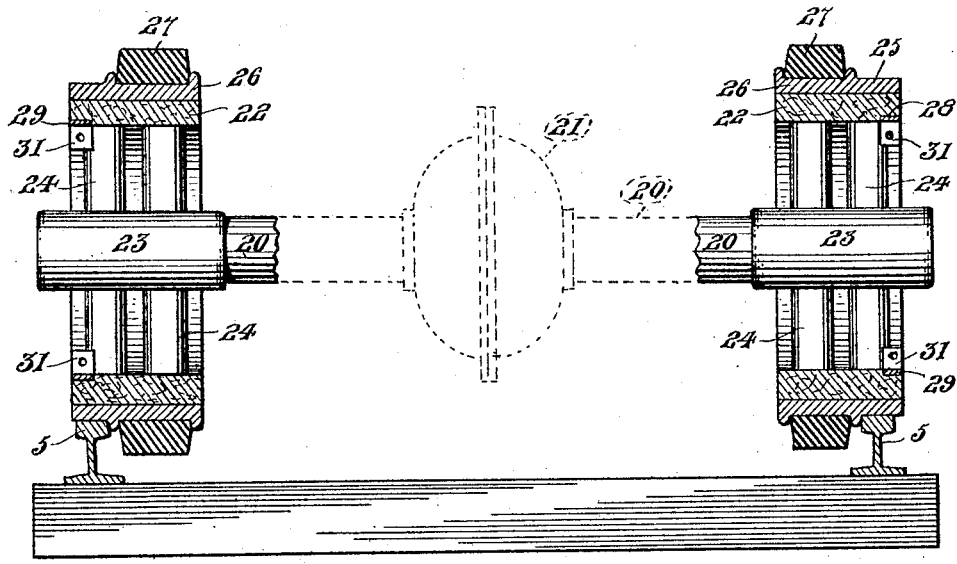

In the drawing, wherein like reference characters designate corresponding parts throughout the several views, Figure 1 is a view partly in transverse section and partly indicated by dotted lines of the rear axle and wheels of the rolling stock with the power transmitting pulley removed.

Figure 2:
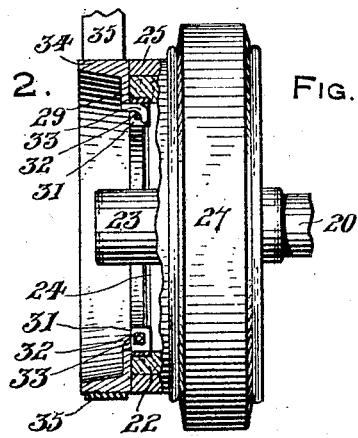
Figure 3:
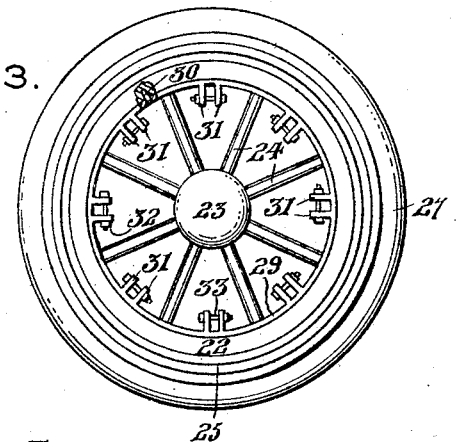
Figure 4:
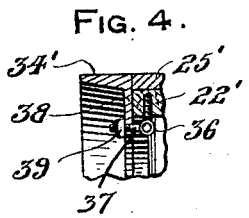
Figure 5:
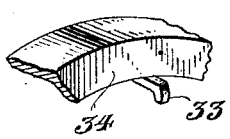

Figure 2 is a fragmentary view partly in edge elevation and partly in transverse section of one of the wheels shown in Fig. 1 and the power transmitting pulley attached, Figure 3 is a side elevational view, partly broken away, of one of the wheels shown in Fig. 1, Figure 4 is a fragmentary transverse sectional view showing a modified form of pulley attaching means, and Figure 5 is a fragmentary perspective view showing a portion of the power transmitting pulley.

Referring in detail to the several views, a wheel construction for the railway is shown whereby the rolling stock may be utilized in the general nature of an automobile wherein the usual rear axle casing 20 extends from each side of the differential housing 21 and contains the opposed axles for driving the rear supporting wheels 22. The rear supporting wheels each embody a hub member 23 with a concentric rim connected thereto by means of spokes 24 and which spokes are preferably provided in pairs as the rim is made substantially twice the usual width for accommodating a special rim including an outer rail engaging portion 25 and an inner portion 26 carrying a cushion tire 27, whereby the vehicle or rolling stock may travel on land as well as upon the rails 5. The rim of the wheel 22 is provided with an interior annular groove or rabbet 28 adjacent its outer edge, and a metallic ring 29 is tightly fitted in this groove and there secured by suitable fastening means such as a screw 30 or the like. The ring 29 is provided with a series of inwardly projecting lugs 31 arranged in pairs between each pair of spokes and apertured for the reception of a bolt 32 which is engaged by a hook member 33 extending laterally from a ring pulley 34, one hook 33 being provided for each pair of lugs 31 and their bolt, each hook 33 passing between a pair of lugs 31 and engaging a bolt 32 whereby the pulley 34 is rigidly attached against one edge of the wheel and its rim. By jacking up the rear of the vehicle, and passing a belt 35 around the pulley 34, the power of the vehicle may be employed for operating various machinery such as threshing machines, saws and the like.

Referring to Fig. 4, a modified form of attaching means for the pulley is shown, the pulley being denoted by the numeral 34' while 22' indicates the felly and the numeral 25' indicates the rim of the wheel. In this form of the invention the ring 29 is dispensed with and a series of inwardly projecting eye bolts 36 are secured to the felly 22' and have further bolts 37 pivoted thereto which pass through the inwardly extending flange 38 of the pulley, a nut 39 being threaded upon each bolt 37 for rigidly securing the pulley 34' against the rim and felly of the wheel.

From the foregoing description, it is believed that the construction and operation as well as the advantages of the several features of the invention described above will be readily understood and appreciated by those skilled in the art.

Minor changes may be made in the invention without departing from the spirit and scope of the invention as claimed.

What is claimed as new is:—

1. Means for attaching a pulley to a vehicle wheel comprising a ring adapted to be rigidly secured to the inner face of a wheel felly, a ring pulley, and cooperating means upon the pulley and ring for detachably connecting the same.

2. Means for attaching a pulley to a vehicle wheel comprising a ring adapted to be rigidly secured to the inner face of a wheel felly, a ring pulley, cooperating means upon the pulley and ring for detachably connecting the same, said last named means including laterally extending hook members rigid with the pulley and inwardly projecting pairs of lugs formed upon the ring and having transverse bolts therethrough, said hook-shaped members extending between the pairs of lugs and engaging the bolts thereof.

3. Means for attaching a pulley to a vehicle wheel comprising a ring adapted to be rigidly secured to the inner face of a wheel felly, a ring pulley having an inwardly extending side flange, and means connecting said flange with the felly of the wheel for detachably fastening the pulley against the outer edge of the wheel felly and rim.

In testimony whereof I affix my signature.

JOHN SIEMBAB.